(12) United States Patent
Elovici et al.

(10) Patent No.: US 9,609,483 B2
(45) Date of Patent: Mar. 28, 2017

(54) SYSTEM FOR CHARACTERIZING GEOGRAPHICAL LOCATIONS BASED ON MULTI SENSORS ANONYMOUS DATA SOURCES

(71) Applicant: DEUTSCHE TELEKOM AG, Bonn (DE)

(72) Inventors: Yuval Elovici, Aruguot (IL); Dudu Mimran, Tel Aviv (IL); Bark Chizi, Ashkelon (IL); Alexander Binun, Beer Sheva (IL); Moshe Bixenspaner, Beer Sheva (IL); Pavel Ackerman, Cumming, GA (US)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/328,781

(22) Filed: Jul. 11, 2014

(65) Prior Publication Data

US 2015/0018020 A1 Jan. 15, 2015

(51) Int. Cl.
*H04W 4/02* (2009.01)
*H04L 29/08* (2006.01)
*H04W 4/08* (2009.01)

(52) U.S. Cl.
CPC ............ *H04W 4/028* (2013.01); *H04W 4/02* (2013.01); *H04L 67/22* (2013.01); *H04L 67/306* (2013.01); *H04W 4/08* (2013.01)

(58) Field of Classification Search
CPC ......... H04W 4/028; H04W 4/02; H04W 4/08; H04L 67/306; H04L 67/22
See application file for complete search history.

(56) References Cited

U.S. PATENT DOCUMENTS

| | | | |
|---|---|---|---|
| 7,734,297 B1* | 6/2010 | Narkilahti et al. | 455/452.2 |
| 8,170,971 B1* | 5/2012 | Wilson et al. | 706/46 |
| 8,207,844 B2* | 6/2012 | Yu | 340/539.13 |
| 8,521,132 B2* | 8/2013 | Washio | 455/411 |
| 8,792,909 B1* | 7/2014 | Xu et al. | 455/456.1 |
| 8,879,551 B2* | 11/2014 | Anthony et al. | 370/389 |
| 2009/0247193 A1* | 10/2009 | Kalavade | 455/456.3 |
| 2010/0041391 A1* | 2/2010 | Spivey et al. | 455/425 |
| 2011/0151839 A1 | 6/2011 | Bolon | |
| 2011/0319060 A1* | 12/2011 | Gentemann | 455/414.1 |

(Continued)

OTHER PUBLICATIONS

European Search Report for a counterpart foreign application, mailed on Dec. 16, 2014; 11 pages.

*Primary Examiner* — Nathan Mitchell
(74) *Attorney, Agent, or Firm* — Roach Brown McCart & Gruber, P.C.; Kevin D. McCarthy

(57) ABSTRACT

System and method for characterizing a geographical location by finding the behavioral patterns of groups of users of mobile devices being in the vicinity of the geographical location. Accordingly, after an examined Point of Interest is determined, signaling data related to the users is aggregated over a limited period of time, from the cellular network they use. The location, including change in the location of the users, is continuously calculated and cross-checked with anonymous multi-sensors with data records from external data sources. Then the mobility patterns of users are derived and the users are classified to groups according to the cross-checking results. Finally, the geographical location is characterized according to the mobility patterns and the classification.

14 Claims, 2 Drawing Sheets

(56) References Cited

U.S. PATENT DOCUMENTS

| | | |
|---|---|---|
| 2012/0071131 A1* | 3/2012 | Zisapel et al. ................. 455/410 |
| 2012/0115475 A1* | 5/2012 | Miyake et al. ............ 455/435.1 |
| 2012/0226554 A1 | 9/2012 | Schmidt |
| 2012/0315839 A1* | 12/2012 | Mumcuoglu et al. ........ 455/2.01 |
| 2013/0084847 A1* | 4/2013 | Tibbitts et al. ................ 455/419 |
| 2013/0102283 A1 | 4/2013 | Lau |
| 2013/0178185 A1* | 7/2013 | Park et al. ................. 455/404.2 |
| 2013/0295877 A1* | 11/2013 | Leemet et al. ................ 455/405 |
| 2014/0038553 A1* | 2/2014 | Gordon et al. ................ 455/410 |
| 2014/0128105 A1* | 5/2014 | Su et al. .................... 455/456.3 |
| 2014/0195380 A1* | 7/2014 | Jamtgaard et al. ........ 705/26.61 |
| 2014/0274022 A1* | 9/2014 | Bell et al. ..................... 455/418 |
| 2015/0065098 A1* | 3/2015 | Pfau ........................... 455/414.1 |

\* cited by examiner

SYSTEM FOR CHARACTERIZING GEOGRAPHICAL LOCATIONS BASED ON MULTI SENSORS ANONYMOUS DATA SOURCES

FIELD OF THE INVENTION

The present invention relates to the field of location based services. More particularly, the invention relates to a method and system for characterizing geographical locations of groups of users of mobile devices, based on data that is collected from multi sensors anonymous data sources.

BACKGROUND OF THE INVENTION

As the use mobile devices, such as cellphones and smartphones became very popular and widespread, the usage patterns of such devices may be helpful to obtain insights about the behavior and characterizing parameters of the users of these devices. These insights are essential to optimally direct targeted information, such as advertisement, to different groups of users that may have common interest in this information. Such insights may be strongly related to the location of users that compose a group.

For example, if an initiator considers opening a new business, a decision where is the best place to open the new business is strongly affected by the common characteristics of the group of users which are likely to consume goods or services from this particular new business. Such characteristics may be obtained by conducting surveys among potential clients or by consulting experts which have experience regarding the type of business and the potential clients' behavior.

Geographical location of a user, as well as changes in location may provide information about the user regarding his residence place, and in which places he spends his time. Location data is readily available from the cellular networks, since as long as the mobile device is active (turned on), it is registered in the closest base stations and by triangulation or other calculations, it is possible to obtain the locations of each user over time with sufficient accuracy.

Prior art methods have already used geographical location information about users, which is derived from cellular networks. For example, location information about users has been continuously collected for long periods of time (e.g., over a month). As a result, changes of locations have been used to obtain information about the user, while correlating it with time. For example, during nighttime, it can be seen that for most users, there is no change in location. Since the stationary location is known, it is assumed that this stationary location is the place of residence. Therefore, it is possible to know where each user lives (his address or at least the street) and to use this information to estimate to which socioeconomic status he belongs. Then it is possible to analyze this information which is collected about all users, to derive several characteristics about groups of users that may have common attributes as a group. However, such a continuous tracking and storage of the collected information seriously infringes the privacy of the users and in some countries, is even against the law. In some countries, such a continuous collection of information is limited by law to be up to 90 minutes only. This limitation results in reducing the ability of prior art methods to characterize the location parameters of the users, in order to construct a reliable pattern of the location of groups of users.

It is therefore an object of the present invention to provide a method and system for characterizing geographical locations of groups of users of mobile devices, which eliminate the need to continuously tracking the location of each user.

It is another object of the present invention to provide a method and system for characterizing geographical locations of groups of users of mobile devices, which provide insights about the behavior and characterizing parameters of the users of these devices.

It is a further object of the present invention to provide a method and system for characterizing geographical locations of groups of users of mobile devices, which provide a reliable pattern of the location of groups of users, while keeping the privacy of each user.

Other objects and advantages of the invention will become apparent as the description proceeds.

SUMMARY OF THE INVENTION

The present invention is directed to a method for characterizing a geographical location by finding the behavioral patterns of groups of users of mobile devices being in the vicinity of the geographical location. Accordingly, after an examined. Point of Interest (POI, such as a street, a particular address, or a shop) is determined, signaling data related to the users is aggregated over a limited period of time, from the cellular network they use. The location including change in the location of the users is continuously calculated and cross-checked with anonymous multi-sensors with data records from external data sources. Then the mobility patterns of users are derived and the users are classified to groups according to the cross-checking results. Finally, the geographical location is characterized according to the mobility patterns and the classification.

The aggregated information may be related to a group of users having common characteristics. The user's identity details are erased after the limited period of time lapses.

The Multi Sensors Data Sources may comprise one or more of the following:
  Call Data Records (CDRs);
  infrastructure data including geographical properties;
  Location Data Records (LDRs);
  CRM data;
  Static Geographical Data Sets;
  Dynamical datasets that has geographical nature.

The mobility patterns of users may be summed during aggregation by using statistical models, while periodically re-summing the mobility patterns. The statistical models may include Voronoi spaces or a server estimation method.

The aggregation may include aggregations of movements or aggregations of analyzed properties.

The present invention is also directed to a system for characterizing a geographical locations by finding the behavioral patterns of groups of users of mobile devices being in the vicinity of the geographical location, which comprises:

a) a plurality of anonymous multi-sensors having data records from external data sources;

b) a database for aggregating, over a limited period of time, signaling data related to the users, from the cellular network they use;

c) processing means for calculating the location including change in the location of the users;

d) a privacy watcher module for replacing all original identities of users by syntactic identities, while changing the identities every predetermined time;

e) a signaling location, provider for translating the signaling records of the cellular provider into geographical location coordinates;

f) an aggregation and fusion engine for connecting the different data types which were aggregated, into a unified data set; and g) an actionable insight provider for receiving and processing the unified data set and for providing insights regarding.

The actionable insight provider may include:

a) a periodical reports module for issuing periodical reports that provide an answer to predefined business questions;

b) a Report Generator module, for allowing enable the user to create individual reports and to formulates individual business questions;

c) an Algorithm Engine module for supporting insight for predicting, verifying and discovering behavioral patterns.

d) an Alerts Mechanism module, for allowing the user to define an event and to attached an alert to it; and e) a Visual Exploration interface module, for discovery and exploration, by allowing the user to browse all outputs from the insight provider in order to gain more knowledge.

DETAILED DESCRIPTION OF PREFERRED EMBODIMENTS

Figure 1:
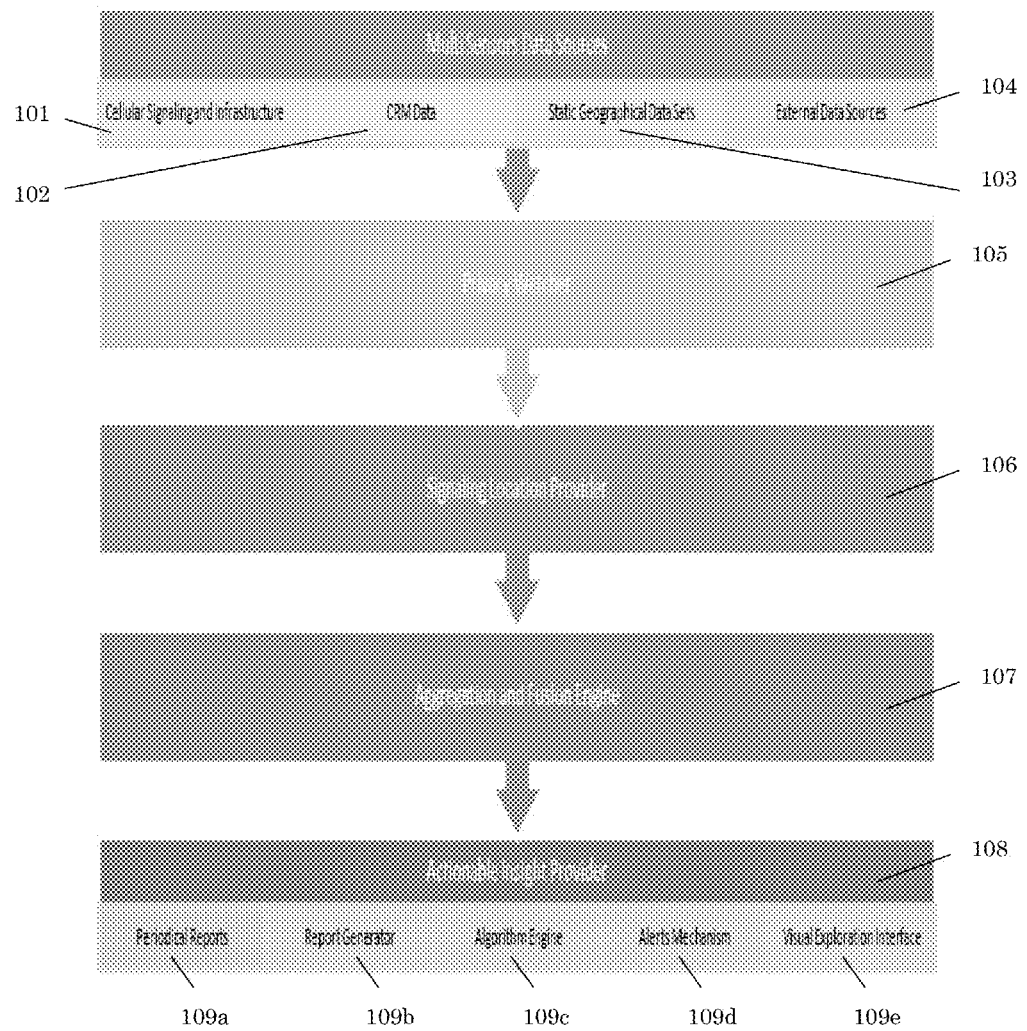
FIG. 1 schematically illustrates the system architecture proposed by the present invention.

The system proposed by the present invention provides information and knowledge regarding an examined Point of Interest (POI) or a set of such points of interest, for example, a street, a particular address, a shopping mall etc. This knowledge includes characterizing groups of people who are users of mobile devices with respect to an examined POI, and is based on the location data of the mobile device carried by each of the users. The desired knowledge may include information about the type of people who visited or passed near the POI, how many are they, and what are the behavioral and mobility patterns of these groups of people. For example, if there is an enterprise which is located near shopping mall, and there is a passage into this shopping mall, and their mobility pattern shows that a large group of people arrives to the enterprise in the morning around the same starting hour, it can be assumed that they are employees of the enterprise. Their mobility pattern will further show that at noon, most of the group moves to the shopping mall to have lunch together and back to the enterprise after a 1 hour lunch break. This knowledge may derive an insight regarding which advertisement is optimal to be demonstrated to this group, assuming that they belong to the same socioeconomic class. Another insight is that the optimal POI for placing the advertisement is the passage, since most of them use it. Another insight is that the optimal timing for placing the advertisement in the passage is at noon.

There is high importance to know the mobility pattern of users and particularly in which route he moves from place to place, where he stays at night, and where he lives. Then, it is possible to correlate the derived information with data from other resources, such as Customer Relationship Management (CRM—which is a model for managing a company's interactions with current and future customers, using technology to organize, automate, and synchronize sales, marketing, customer service, and technical support), in order to obtain information about the user regarding which kind of a person he is, which financial account he has, which types of products he purchased etc. This is done mainly by aggregating unlabeled data records that are driven from CRM systems, signaling data (from the cellular network he uses), static geographical datasets (e.g., the locations of POIs) and external datasets and by cross-checking the aggregated data. This allows optimally characterizing a particular geographical place (POI), based on signals from the cellular network. The collected signals allow dynamically calculating the location of each user with a level of accuracy that is sufficient for associating the location with a particular road or trail. Therefore, it is possible to associate the mobility pattern of a user with a particular POI, such as a store, and to construct his consumer pattern.

The main advantage of the system proposed by the present invention is that due to privacy limitations and regulations, it uses only anonymous records. These records hold no particular identity (such as name, ID, cellular ID, etc.), but only aggregation of information about a group of users with some common characteristics that can be defined, while there is no interest in information about a specific person (in order to keep his privacy).

Accordingly, the collected geographical data is kept for a relatively short period (e.g., 90 minutes) and then the user's identity details are erased. Correlation with data collected from other data sources, such as CRM systems, allows performing time based and location based analysis, which is based on relatively short time data collection, in order to construct the mobility pattern of the group. Once the mobility pattern of the group is constructed, the collected data is erased. This process can be repeated after erasing the former data, in order to get an optimal insight, based on a collection of constructed patterns.

System Architecture

FIG. 1 schematically illustrates the system architecture proposed by the present invention. The proposed system architecture enables input of millions of records per minute. Furthermore, the system suggests variety of outputs: periodical reports, alerts and an exploration interface that contains advanced queries, algorithms and visualization engine.

The proposed system uses Multi Sensors Data Sources, where the input to the system consists of a variety of input sources with different data types. These input sources may comprise one or more of the following:

1. A Cellular Signaling and Infrastructure 101—this data source relates to:
    a. Call Data Records (CDRs—which are data records produced by a telephone exchange or other telecommunications equipment documenting the details of a phone call that passed through the facility or device) of any kind phone, IP or any communication record (sometimes known as XDR's).
    b. Infrastructure data including geographical properties—this data includes geographical locations of base stations, transceivers and antennas deployed to communicate with the mobile devices of users.
    c. Location Data Records (LDR's—records about the location and changes in location over time) of the entities (users' mobile devices) in the system.
2. CRM data 102—this data source relates to the knowledge saved by the cellular operator about its user. This dataset contains besides socio demographical features on the users, also their segmentation and their past activity and purchases on the network.

3. Static Geographical Data Sets 103—this data source relates to any geographical data driven from external source (i.e. the national chamber of statistics) and has geographical anchor. This dataset has static nature and it is not changing overtime (even though it may be updated from time to time).

4. External Data Sources 104—this data source relates to other dynamical datasets that has geographical nature besides cellular signaling. This can include social navigation application datasets (e.g., WAZE or other location related social networks), or any data application that provides any activity attached to its location.

The proposed system also comprises a privacy watcher 105, which is a unit that supports all the rules and regulation provide by the operator and the regulator. This is done mainly in order to keep the right for privacy for each customer. The privacy watcher 105 eliminates all original identity and replaced it by syntactic one. Furthermore, the watcher is changing the identities every constant number of minutes. This is done mainly in order to prevent any tracking or tracing possibility of the customer.

The proposed system also comprises a signaling location provider 106, which translates the signaling records of the cellular provider into geographical location coordinates (x,y or latitude and altitude). A main component of the location provider is the Location Algorithm (LA). The Location Algorithm (LA) relates the infrastructure (the antennas installed by a cellular company) to the cellular devices (including their locations expressed in the geodesic coordinates). Devices are served by the antennas. The LA includes the following use cases:

1. The Space Covered by a Given Antenna (Space4Antenna)—Given an antenna A and its sector S (at least one sectors per antenna). Space4Antenna(A,S) returns the polygon (geographical zone) P, such that each device residing within P served by an antenna A in sector S. This is done by building the Voronoi diagram (an algorithm that can find the polygon which covers a particular location or area) from the set of antennas. The Voronoi diagram is divided into Voronoi spaces. A Voronoi space for an antenna A is divided into "subspaces" that correspond to individual sectors of A.

2. The Center of a Voronoi space (CenterVoronoi)—Given a polygon P which is the output of Space4Antenna). The algorithm CenterVoronoi(P) returns the center of P. This is done by computing the center of gravity of a polygon P assuming that the mass is distributed uniformly over P.

3. Service Provider for a Given Cell (ServiceProvider)—Given a cellular device C represented as a point, the algorithm ServiceProvider(C) returns the pair (Antenna, Sector) such that C is served by the antenna Antenna in the sector Sector. This is done by building the grid index for the whole space being examined (e.g. Berlin, whole Germany). During the grid building, each grid square is associated with the antennas it contains and each antenna is associated to the containing square. For a cell C, the following actions are performed:
  1. Retrieve the grid square GS that contains C.
  2. Find all Voronoi spaces (including their antennas and sectors) that intersect GS
  3. Traverse the list of antennas from Step 2 and find the antenna A nearest to C.
  4. Find the sector S of A such that C is within the Voronoi space formed by (A,S)

The aggregation and fusion engine 107 enables the system to connect the different data types into unified aggregated data set. This data set is the immediate input for the actionable insight provider 108. All aggregations are time variant and supplied information about the activity by the hour, day, month and year. The aggregations suggest the following:

1. Aggregations of movements—these aggregations summarize the movements of the discussed entities over the analyzed polygon. It contains routes and visits of the entities.

2. Aggregations of analyzed properties—these aggregations summarize the values of the socio-demographical properties, static geographical features and other external features.

During aggregation, the mobility patterns of users are summed using statistical models such as Voronoi spaces, while periodically re-summing the mobility patterns of users. Alternatively, other statistical models may be used rather than Voronoi spaces. For example, it is possible to use the server estimation method, which provides a probabilistic estimation using a combination of lines of sight and the signal strength from mobile phones, as received by the base-station's antenna, provided that there is a line of sight. This method is used for estimating the speed at which the user moves.

The actionable insight provider 108 suggests five different modules to gain actionable insights:

1. Periodical Reports module 109a—Periodical reports that supply an answer to a predefined business questions. The reports can be produces from prepared templates through an interface or by using API with third party application. The report can reflect an investigation on a point of interest—POI, a set of POI's or benchmark reports.

2. Report Generator module 109b—Report generator that enable the user to create his own report, formulating his own business questions. This can be done by an interface or by using API with a third party application.

3. Algorithm Engine module 109c—This engine provides state of the art algorithms that support insight for predicting, verifying and discovering behavioral patterns. All outputs from this engine provide a description of the behavioral pattern, its statistical evidence and immediate recommendation for action.

4. Alerts Mechanism module 109d—This Mechanism enables the user to define an event (using a template or defining one through an interface) and attached an alert to it, when a threshold is passed. The alerts can be passed through all set of possible communication method (call, SMS, mail etc.)

5. Visual Exploration Interface module 109e—This module refers to a discovery and exploration interface that use visualization methods (such as heat map, statistical charts, network diagram). The interface allows the user to browse all outputs from the insight provider in order to gain more knowledge.

Figure 2:
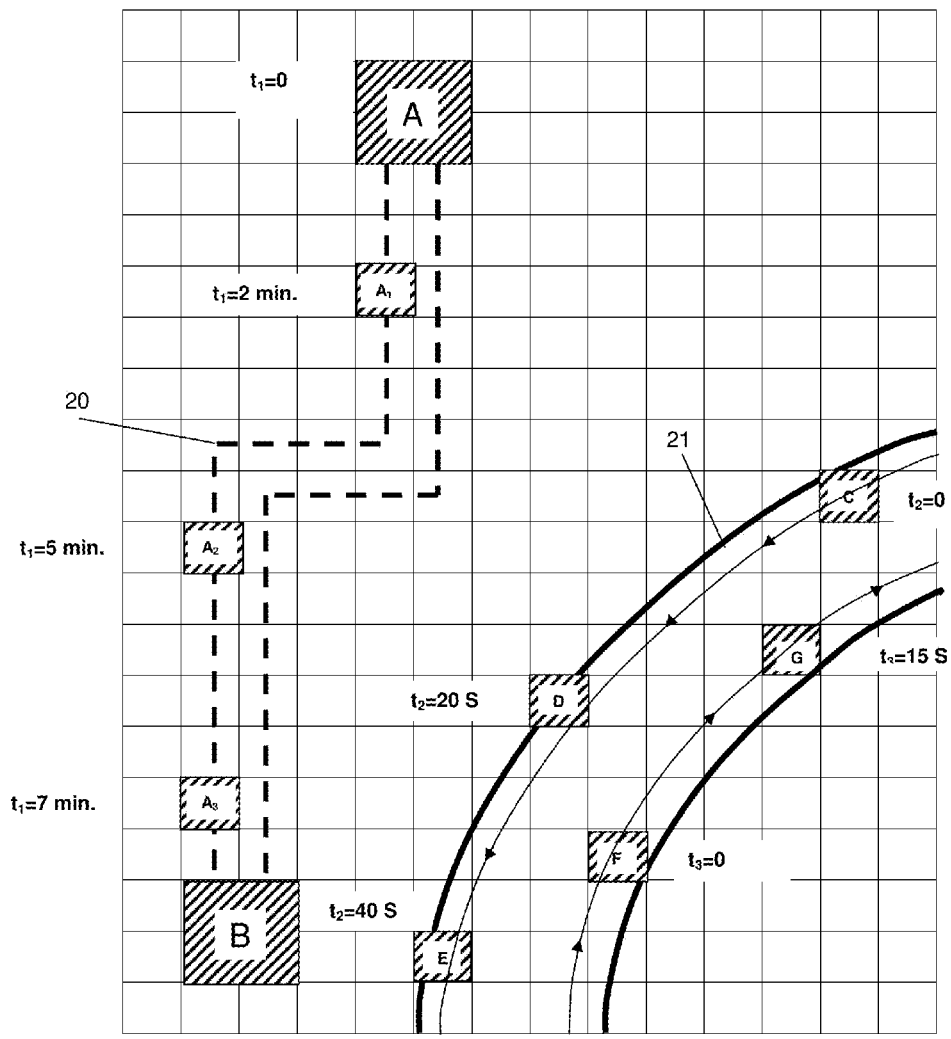
FIG. 2 illustrates several mobility patterns that are generated for different users, according to a preferred embodiment of the invention.

FIG. 2 illustrates several mobility patterns that are generated for different users, according to a preferred embodiment of the invention. Accordingly, the location data is aggregated for each user for a short period of time and at several time points. At $t_1=0$, a first user is location at point A. At $t_1=2$ min., the first user is location at point A1. At $t_1=5$ min., the first user is location at point A2. At $t_1=7$ min., the first user is location at point A3. At $t_1=8$ min., the first user is location at point B, which is his destination. Correlation with the External Data Source 104 which provides maps of the area identifies that the first user actually walks on a trail 20, leading from A to B. The same analysis may be performed for all users passing along trail 20.

At $t_2=0$, a second user is location at point C. At $t_2=20$ sec., the second user is location at point D. At $t_2=40$ sec., the second user is location at point E. Correlation with the External Data Source 104 which provides maps of the area identifies that the second user actually moves in a vehicle on a road 21, in the direction from C to E. The same analysis may be performed for all users passing along road 21 from C to E.

At $t_3=0$, a third user is location at point F. At $t_3=15$ sec., the third user is location at point G. Correlation with the External Data Source 104 which provides maps of the area identifies that the third user actually moves in a vehicle on the same road 21, but in the opposite direction, from F to G. The same analysis may be performed for all users passing along road 21 from F to G.

If the aggregated data is summed for all users over time, it is possible to know how many users were moving on trail 20 in each direction and in each time point, as well as how many users were moving on road 21 in each direction and in each time point. Cross-checking the aggregated data with CRM may reveal, for example, how many users in the age of 20-25 were moving on road 21 in each direction and at a particular time interval. Another insight may be that a group of female users in the age of 30-35 were moving on road 21 in a particular direction at a particular timing and on another road at a different timing. Therefore, the system proposed by the present invention is adapted to provide accurate and meaningful insights while aggregating data about users along a short distance and over a short period of time.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A privacy complying computerized method for characterizing a geographical location by finding the behavioral patterns of groups of users of mobile devices being in the vicinity of said geographical location, comprising:
   a) selecting a Point of Interest (POI) to be examined;
   b) by a processor enabled computerized device comprising an electronic privacy watcher device:
      i) receiving at a first time, user-specific signaling data transmitted from a transceiver of one or more base stations in the vicinity of said POI which is related to all communication events involving a mobile device of each of said users within a corresponding cellular network and in the vicinity of said POI, wherein said received signaling data includes an identifier of each of said mobile devices and is stored in a secured address of a memory device of said privacy watcher device which can be accessed only by said processor;
      ii) continuously extracting from said received signaling data a location, including changes in the location, of each of said users as indicated by the identifier of a corresponding mobile device, to produce location data;
      iii) associating the produced location data with a map to identify one or more known points of said map in the vicinity of said POI which have been frequented by each of said users within a second period of time prior to said first time;
      iv) deriving a mobility pattern of users by generating a path coinciding with each of said known points that have been frequented thereby within said second period of time;
      v) aggregating a plurality of said mobility patterns into groups; and
      vi) characterizing said POI according to said mobility patterns; and
   c) by said privacy watcher device, permanently erasing the identifier of each of said mobile devices from said memory device by a secure deletion at a predetermined third time following said first time.

2. The method according to claim 1, wherein the aggregated mobility patterns are related to a group of users who have frequented a common path in a same direction within said second period of time.

3. The method according to claim 1, wherein the multi sensors data sources are selected from the group consisting of:
   Call Data Records (CDRs);
   Infrastructure data including geographical properties;
   Location Data Records (LDRs);
   CRM data;
   Static Geographical Data Sets; and
   Dynamical datasets that are of a geographical nature.

4. The method according to claim 1, wherein the mobility patterns of users are summed during aggregation by using statistical models, while periodically re-summing said mobility patterns.

5. The method according to claim 4, wherein the statistical models are selected from the group consisting of:
   Voronoi spaces; and
   server estimation method.

6. The method according to claim 1, wherein the aggregation is selected from the group consisting of:
   aggregations of movements; and
   aggregations of analyzed properties.

7. The method according to claim 1, wherein the point of interest is selected from the group consisting of:
   a street;
   a particular address; and
   a shop.

8. The method according to claim 1, further comprising the step of cross-checking the location data with anonymous multi-sensors having data records from external data sources in order to increase accuracy in producing the location data.

9. A privacy complying computerized system for characterizing a geographical locations by finding the behavioral patterns of groups of users of mobile devices being in the vicinity of said geographical location, comprising:
   a) a plurality of mobile devices located in the vicinity of a point of interest (POI) to be examined;
   b) one or more base stations in the vicinity of said POI which are configured to generate user-specific signaling data related to all communication events involving each of said plurality of mobile devices within a corresponding cellular network and in the vicinity of said POI, wherein said signaling data includes an identifier of each of said mobile devices;
   c) a base station radio-frequency (RF) transceiver for selectively transmitting said generated signaling data;
   d) a computerized device for receiving and processing said signaling data, comprising:
      i) an RF receiver configured to receive said transmitted signaling data;
      ii) a secured database in which is storable said received user specific signaling data at a first time;

iii) a processor having sole authorization for accessing said database;

iv) a storage device coupled to said processor which is configured to store an aggregation and fusion engine that, when executed by said processor, causes said processor to, (1) continuously extract from said received signaling data a location, including changes in the location, of each of said users as indicated by the identifier of a corresponding mobile device, (2) produce location data, (3) associate the produced location data with a map to identify one or more known points of said map in the vicinity of said POI which have been frequented by each of said users within a second period of time prior to said first time, (4) determine a mobility pattern of each of said users by generating a path coinciding with each of said known points that have been frequented thereby within said second period of time, (5) aggregate a plurality of said mobility patterns into groups, and (6) characterize said POI according to said mobility patterns; and v) an electronic privacy watcher device comprising an electronic timer, for permanently erasing the identifier of each of said mobile devices from said database by a secure deletion at a predetermined third time following said first time.

10. The system according to claim 9, further comprising a plurality of anonymous multi-sensors having data records from external data sources, wherein the computerized device is in data communication with said plurality of multi-sensors, wherein the processor is also configured to extract data from one or more of said records for use in increasing accuracy while producing the location data.

11. The system according to claim 10, wherein the aggregation and fusion engine, when executed by the processor, also causes the processor to connect different data types of the external data sources which were aggregated into a unified data set.

12. The system according to claim 11, wherein the processor comprises an actionable insight provider for receiving and processing said unified data set and for providing insights regarding the determined mobility patterns or the aggregated groups of mobility patterns.

13. The system according to claim 12, wherein the actionable insight provider includes:
   a) a periodical reports module for issuing periodical reports that provide an answer to predefined business questions;
   b) a Report Generator module, for allowing enable the user to create individual reports and to formulates individual business questions;
   c) an Algorithm Engine module for supporting insight for predicting, verifying and discovering behavioral patterns;
   d) an Alerts Mechanism module, for allowing the user to define an event and to attached an alert to it; and
   e) a Visual Exploration Interface module, for discovery and exploration by allowing the user to browse all outputs from the insight provider in order to gain more knowledge.

14. The system according to claim 10, wherein the external data sources are selected from the group consisting of:
Call Data Records (CDRs);
Infrastructure data including geographical properties;
Location Data Records (LDRs);
CRM data;
Static Geographical Data Sets; and
Dynamical datasets that are of a geographical nature.

* * * * *